(12) United States Patent
Schulz

(10) Patent No.: US 7,010,117 B2
(45) Date of Patent: Mar. 7, 2006

(54) MULTI-FREQUENCY TONE DETECTOR

(75) Inventor: Dieter Schulz, Kanata (CA)

(73) Assignee: Zarlink Semiconductor Inc., Ontario (CA)

( * ) Notice: Subject to any disclaimer, the term of this patent is extended or adjusted under 35 U.S.C. 154(b) by 524 days.

(21) Appl. No.: 09/808,684

(22) Filed: Mar. 15, 2001

(65) Prior Publication Data

US 2001/0036260 A1 Nov. 1, 2001

(30) Foreign Application Priority Data

Mar. 17, 2000 (GB) .................................... 0006576

(51) Int. Cl.
*H04M 1/00* (2006.01)
*H04M 3/00* (2006.01)
(52) U.S. Cl. ...................... 379/386; 379/283
(58) Field of Classification Search ............... 379/282, 379/283, 386, 372, 390.02
See application file for complete search history.

(56) References Cited

U.S. PATENT DOCUMENTS 4,231,103 A * 10/1980 Timm .......................... 708/404
5,353,346 A    10/1994 Cox et al.
5,428,680 A     6/1995 Murata et al.
5,644,634 A *   7/1997 Xie et al. ..................... 379/386
6,370,244 B1 *  4/2002 Felder et al. ................. 379/386

FOREIGN PATENT DOCUMENTS

| CA | 2 342 467   | 3/2001  |
| EP | 0 440 028 A2 | 8/1991  |
| EP | 0 570 097 A1 | 11/1993 |
| EP | 0 632 666 A1 | 1/1995  |
| GB | 2219 174 A  | 11/1989 |
| WO | WO 97/20438 | 6/1997  |
| WO | WO 97/25822 | 7/1997  |

* cited by examiner

*Primary Examiner*—Curtis Kuntz
*Assistant Examiner*—Alexander Jamal
(74) *Attorney, Agent, or Firm*—Keating & Bennett, LLP

(57) ABSTRACT

A multi-frequency tone detector with analysis window (i.e. filter size) chosen such that spectral nulls are located at adjacent frequencies of interest. The decision logic block of the tone detector uses the roll-off characteristics of the filter in conjunction with background noise to determine a threshold pass/fail for any tone that has deviated excessively from its nominal value. The foregoing aspects of the invention result in simple filter design (i.e. reduced order) relative to prior art tone detectors.

7 Claims, 6 Drawing Sheets

MULTI-FREQUENCY TONE DETECTOR

FIELD OF THE INVENTION

The present invention relates generally to tone detectors for telephone systems and in particular to an improved tone detector with filter characterized by spectral nulls located to suppress frequencies adjacent the tone to be detected and an improved detection algorithm using roll-off characteristics of the filter and background noise.

BACKGROUND OF THE INVENTION

Multi-Frequency (MF) tones are used extensively in telecommunications. Examples of MF tones are DTMF and R2. Typical prior art tone detectors include a pre-filter for suppressing out-of-band frequencies, an analysis filter for determining the energy of the input signal at each multi-frequency tone of interest, and a decision logic block for interpreting the multi-frequency energy values output from the analysis filter and in response performing a pass/fail test for determining the presence or absence of a tone at each multi-frequency tone of interest.

Prior art analysis filters have been implemented using standard digital filtering techniques. The analysis window for such prior art digital filters must be carefully chosen. Rectangular windows are often used for simplicity. However, the leakage of energies in the side lobes of the rectangular window is such that other MF frequencies may be incorrectly detected. Also, fast roll-off characteristics (i.e. high order) are usually imposed in order to fail any tone that deviates excessively from its nominal value.

SUMMARY OF THE INVENTION

According to one aspect of the present invention there is provided a multi-frequency tone detector with analysis window (i.e. filter size) chosen such that spectral nulls are located at adjacent frequencies of interest. According to another aspect, the decision logic block uses the roll-off characteristics of the filter in conjunction with background noise to determine a threshold pass/fail for any tone that has deviated excessively from its nominal value. The foregoing aspects of the invention result in simpler filter design (i.e. reduced order) relative to prior art tone detectors, while maintaining high tone detection accuracy.

BRIEF DESCRIPTION OF THE DRAWINGS

A preferred embodiment of the present invention will now be described more fully with reference to the accompanying drawings in which.

DETAILED DESCRIPTION OF THE PREFERRED EMBODIMENT

Figure 1:
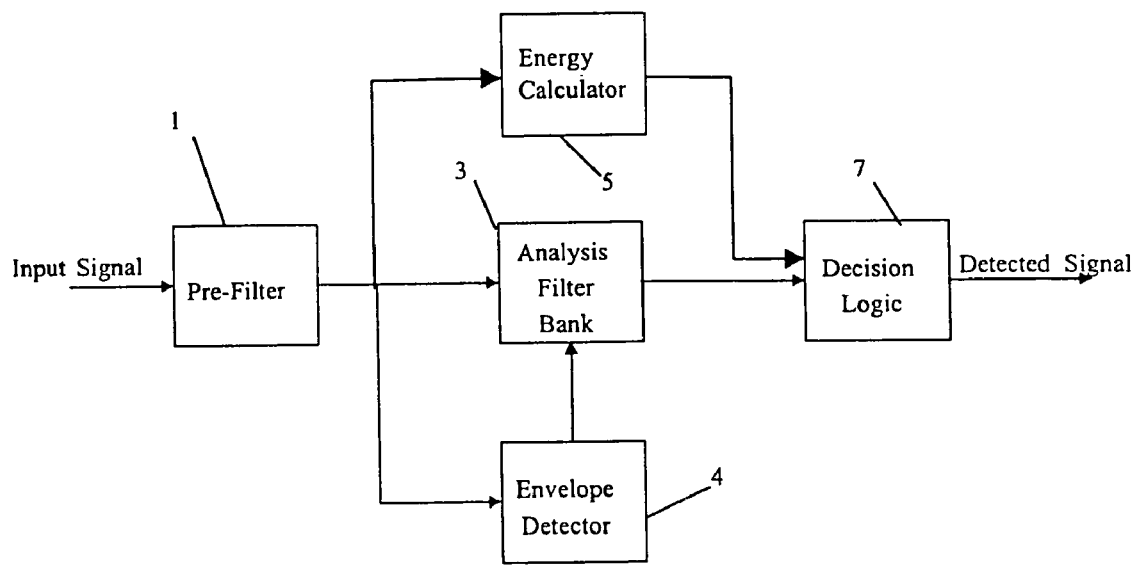
FIG. 1 is a block diagram of a well known multi-frequency tone detector.

FIG. 1 shows a typical tone detector. Pre-filter 1 filters the input signal to suppress out-of-band frequencies. The envelope detector 4 determines whether a signal is present or not and synchronizes the signal edges of the signal with the operation of the analysis filter bank 3. The analysis filter bank consists of multiple filters, one at each MF frequency of interest. These filters calculate the energy of each frequency. The energy calculator 5 computes the total energy of the signal after pre-filtering. The total energy combined with the results of the analysis filter bank 3 is fed to a decision logic block 7 that determines whether a valid tone is present or not. The decision block 7 may perform various tests, such as minimum tone level, twist (if it is a dual tone), maximum frequency deviation, etc. As discussed in greater detail below, according to one aspect of the invention a new method is implemented in decision logic block 7 to determine frequency deviation from a nominal value by using the roll-off in the filter bank 3 combined with background energy.

The analysis filters 3 are implemented as DFT filters using a modified Goertzel algorithm, one for each MF (e.g. R2) frequency. The Goertzel filter is centered at the R2 frequency.

According to the preferred embodiment a rectangular window was chosen for the DFT (Goertzel) filter. The choice of a rectangular window results in reduced complexity relative to other filter types. For example, pre-processing the data with either a raised cosine or Kaiser window has a considerable MIPS impact. As indicated above, however, the leakage of the energies in the side lobes can be significant in rectangular windows (especially if two valid frequencies to be detected have a relative twist). Thus, according to an aspect of the invention, the filter size is chosen in such a way that the other MF frequencies fall in its spectral nulls, thereby greatly reducing the leakage effect.

Figure 2:
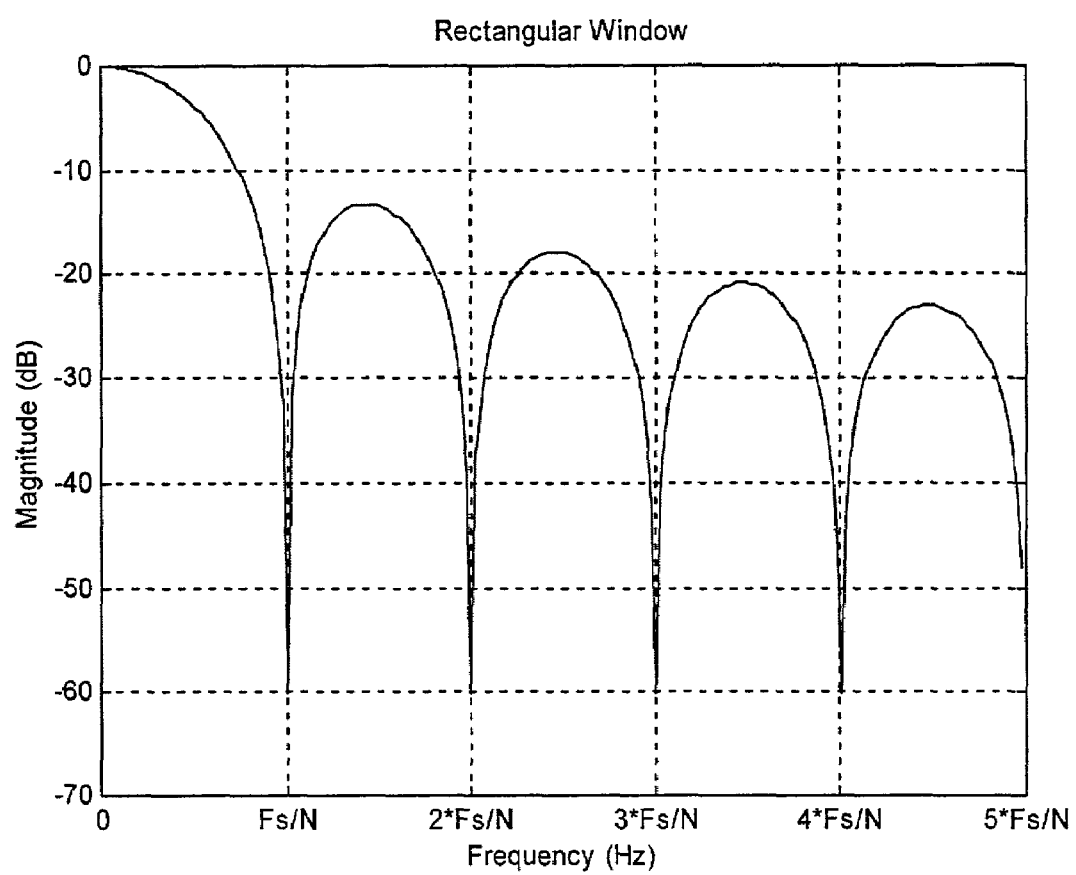
FIG. 2 shows the frequency response of a tone detector filter with rectangular window.

R2 is a special case of MF communication. The six R2 signaling frequencies are situated at 540 Hz, 660 Hz, 780 Hz, 900 Hz, 1020 Hz and 1140 Hz for the backward direction and at 1380 Hz, 1500 Hz, 1620 Hz, 1740 Hz, 1860 Hz and 1980 Hz for the forward direction. Thus, in each direction the frequencies are 120 Hz apart. A window of size N has nulls situated at frequency intervals Fs/N, as shown in FIG. 2. Consequently, for R2 signaling spectral nulls are needed at 120 Hz intervals.

In order to position the nulls at 120 Hz intervals, and assuming a sampling frequency Fs=8 kHz, a window size of 200 samples is chosen for the filter (the minimum window size for nulls at 120 Hz is N=Fs/120 Hz, which is 66.67, such that the smallest integer window is thus N=200).

Figure 3:
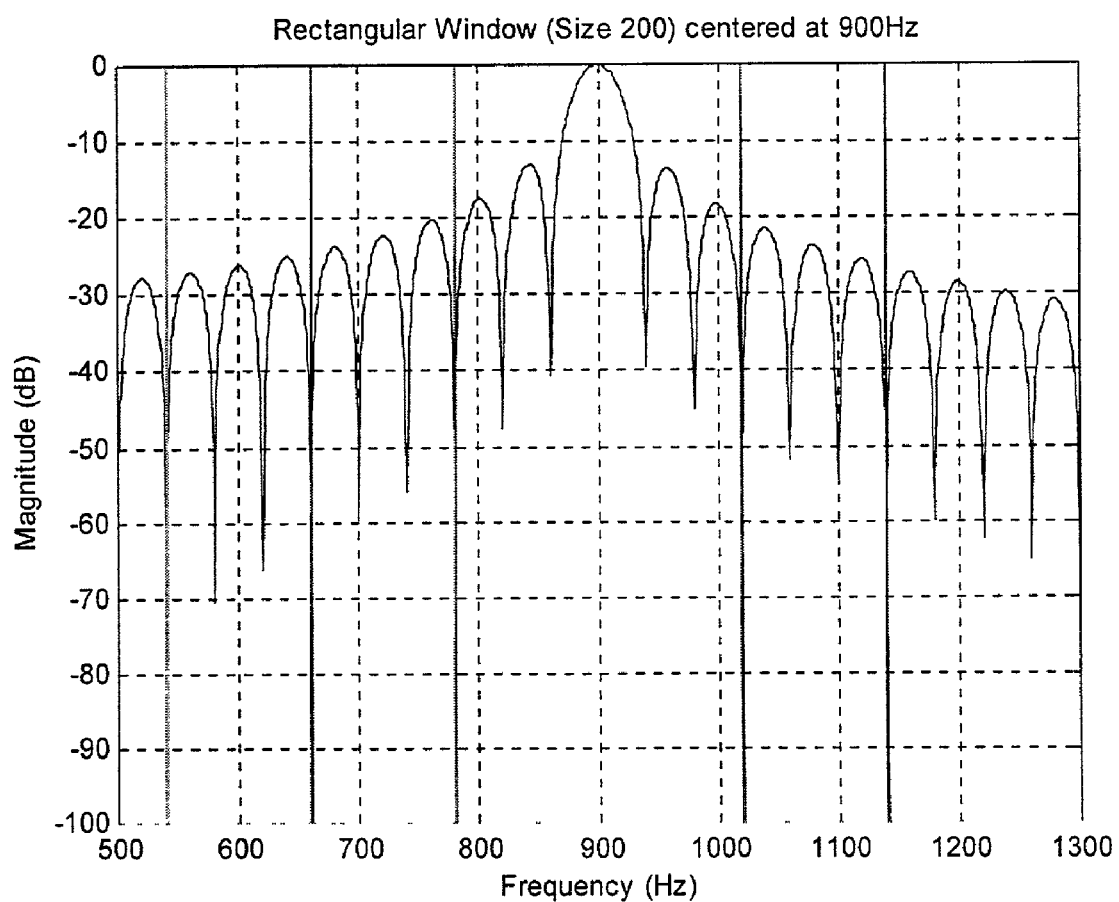
FIG. 3 shows the frequency response of a filter with rectangular window centered at 900 Hz, showing the location of spectral nulls at equally spaced frequencies adjacent 900 Hz, in accordance with the present invention.

For example: If the frequency of interest is at 900 Hz, the filter is centered at 900 Hz using a window of 200 samples. Spectral nulls are therefore located at each of the other MF frequencies, i.e. 540 Hz, 660 Hz, 780 Hz, 1020 Hz and 1140 Hz. FIG. 3 shows the R2 example for a frequency of 900 Hz. It will be noted that the other R2 frequencies fall exactly on the spectral nulls.

For non-equally spaced frequencies (such as DTMF), the approach is not as straight forward as for the equally spaced frequency case. Nonetheless, the windows for each frequency detector (i.e. filter) may be sized in such a way that the closest frequency falls into a null. On the other hand, the window may be chosen such that the interference of the other frequencies is minimized.

Figure 5:
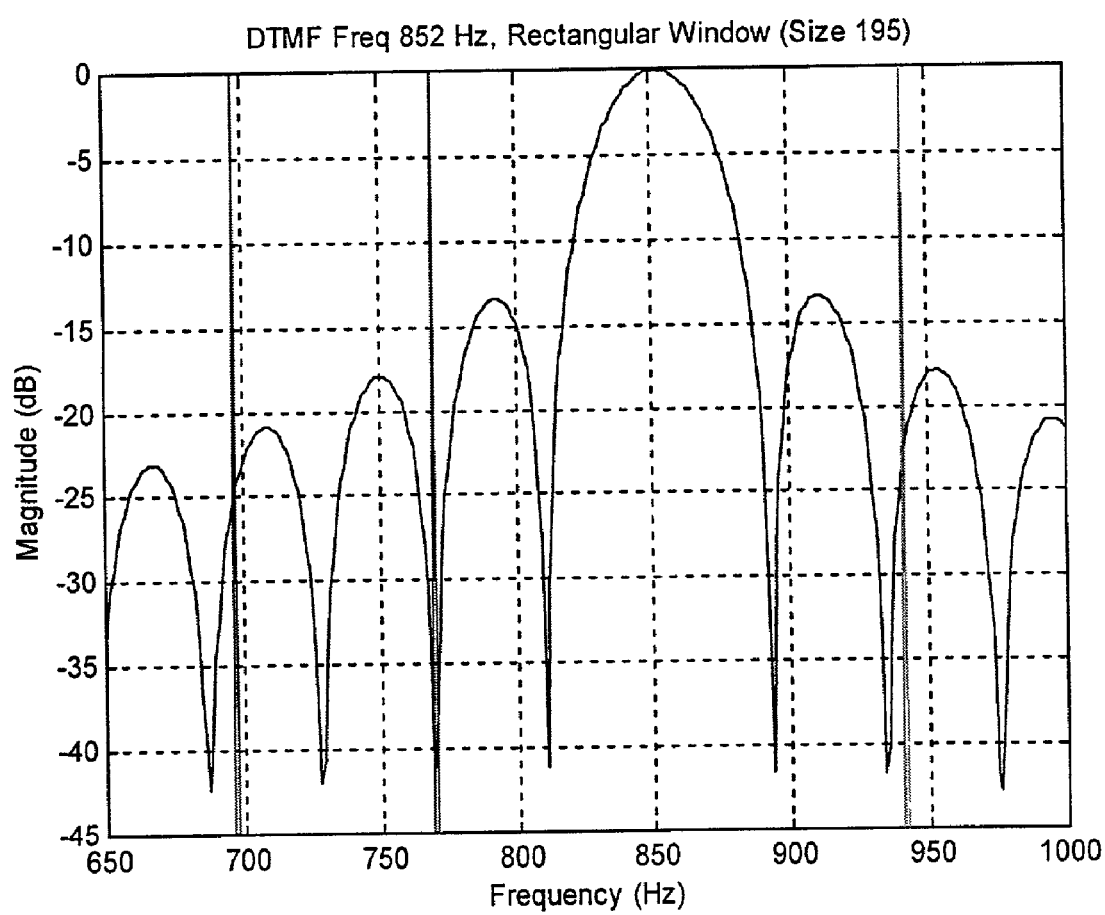
FIG. 5 shows the frequency response of a filter with rectangular window of size N=195, centered at 852 Hz, showing moderate suppression of adjacent DTMF signal frequencies, in accordance with an alternative embodiment of the present invention.
Figure 6:
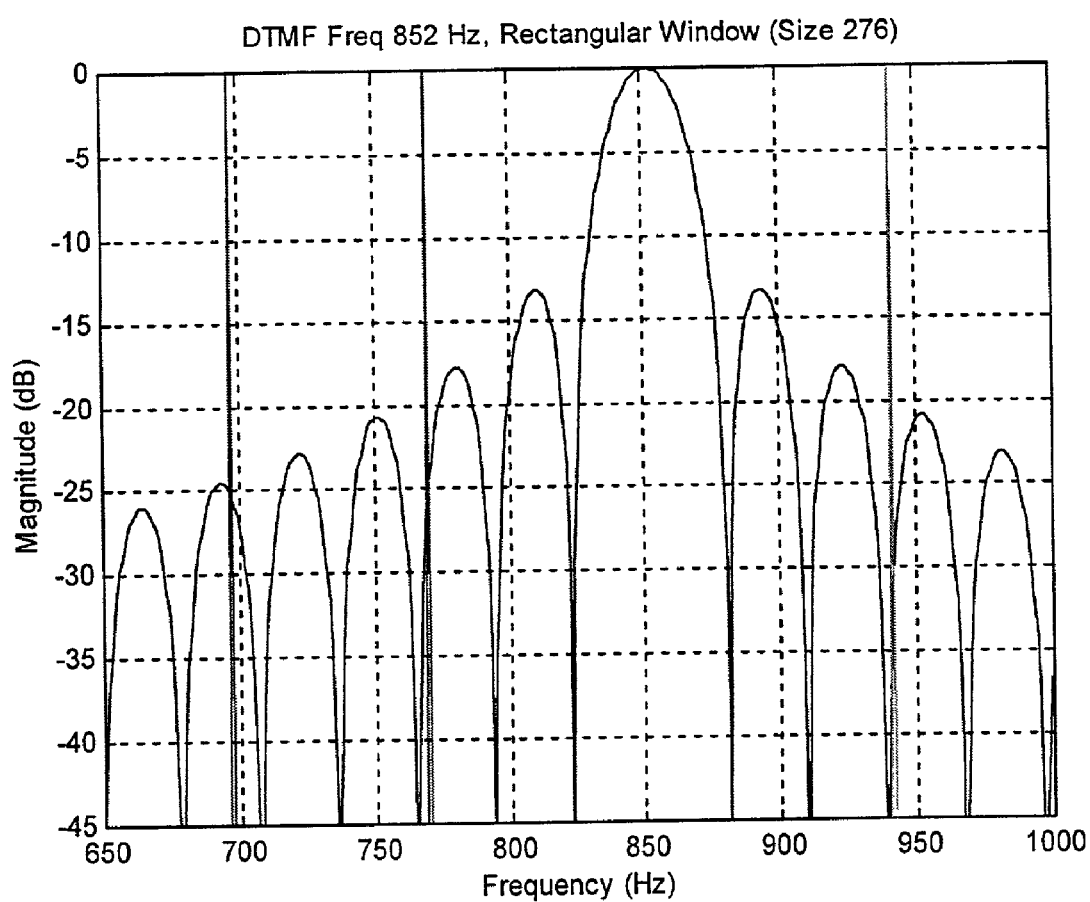
FIG. 6 shows the frequency response of a filter with rectangular window of size N=276, centered at 852 Hz, showing improved suppression of adjacent DTMF signal frequencies, in accordance with an alternative embodiment of the present invention.

For example, if the frequency of interest is the DTMF frequency at 852 Hz., the nearest adjacent frequency is 770 Hz (i.e. separated by 82 Hz). Choosing a window size of N=195 places nulls at intervals of 41 Hz, as shown in FIG. 5. The other DTMF frequencies (697 Hz, 941 Hz) do not fall on the spectral nulls, but are only suppressed by 24.8 dB and 23 dB respectively. However, if the window size is chosen to be N=276 as shown in FIG. 6, none of the DTMF frequencies fall on spectral nulls. Nonetheless, the frequencies are suppressed by 25.3 dB, 24.8 dB and 32.6 dB respectively, thereby improving the overall suppression.

The filters comprising analysis bank 3 may be implemented in many ways. As indicated above, a Goertzel DFT filter was implemented according to the preferred embodiment. Implementations of Goertzel filters are well known in the art (e.g. Burrus, C. S. and T. W. Parks. 1985. DFT/FFT and Convolution Algorithms. New York: Prentice-Hall.). An example of a Goertzel filter for use in the multi-frequency tone detector of the present invention, centered at 900 Hz, is as follows:

```
Fs = 8000; % Sampling Frequency
Fc = 900; % Centre frequency
coeff = (2*cos(2*pi*(Fc/Fs))); % Goertzel coefficient
N = 200; % To create nulls at 40 Hz intervals
BEGIN
        % Feedback phase
        for k = 1:N
            temp = input(k) + coeff*y(1) - y(2);
            y(2) = y(1);
            y(1) = temp;
        end
        % Feedforward phase (Calculates energy in Window)
        Y11 = y(1);
        Y12 = y(2);
        energy = (Y11*Y11 + Y12*Y12 - Y11*Y12*coeff)/N/N;
        return energy
END
```

The return value "energy" is the tone energy at a specific frequency, which is fed into the decision logic 7.

Figure 4:
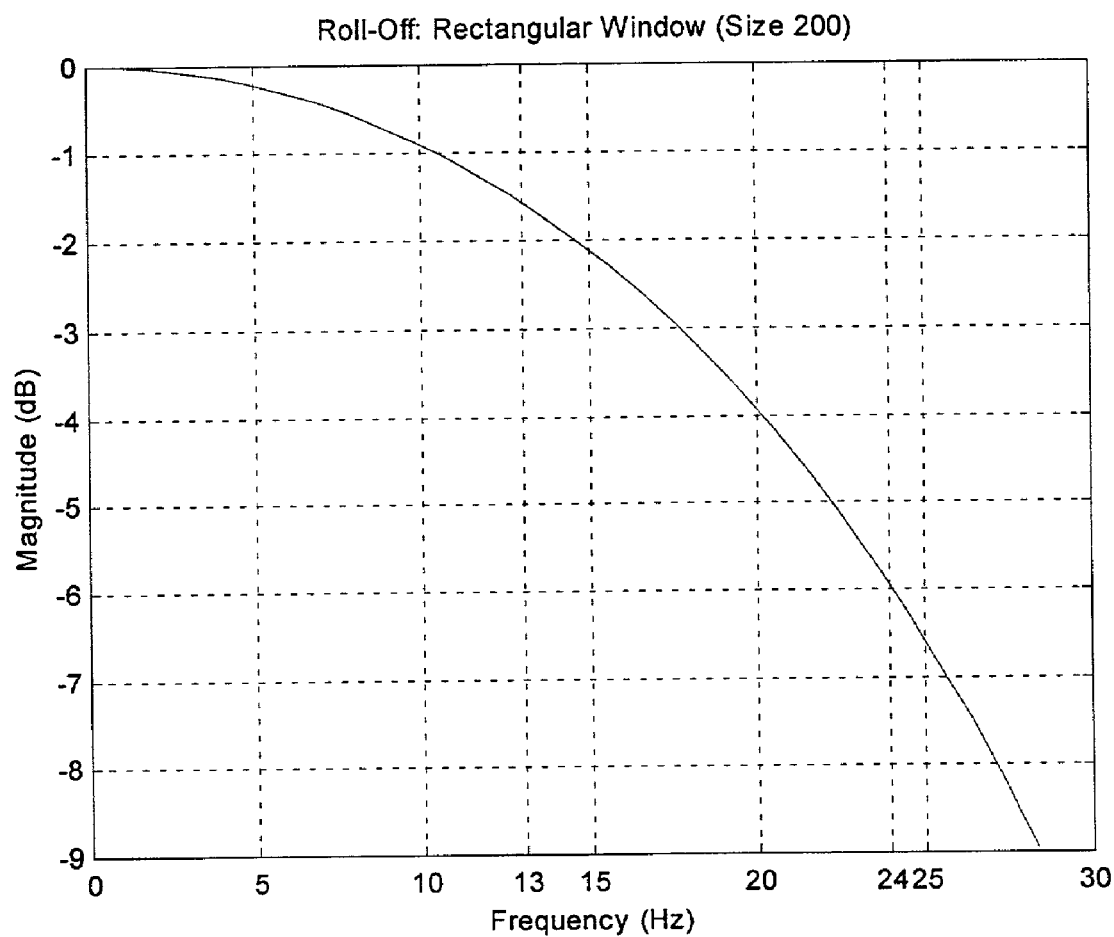
FIG. 4 shows filter roll-off for a filter with rectangular window.

The frequency deviation algorithm implemented within block 7 uses the roll-off of the filter 3 combined with an estimate of the background energy. FIG. 4 shows the roll-off characteristics of a rectangular window (for a size of 200 samples and a sampling rate of $F_s$=8 kHz). Thus, for a single tone frequency deviation of 15 Hz from nominal, the roll-off is about −2 dB. In other words, if a tone deviates 15 Hz from its nominal frequency, its energy in the bin would be 2 dB down from its actual energy. This energy is not "lost", but has leaked outside the bin, contributing to the background energy. Consequently, by calculating the background energy the frequency deviation of the tone may be determined.

Total Energy is the energy of the output of the pre-filter 1. It is made up of the single frequency energy (E) and background noise (n).

Total Energy=$E+n$

The frequency energy is made up of the energy within the analysis filter (E_bin) and the leakage energy due to roll-off (E_ro). Thus, for a single tone:

$E=E$_bin+$E$_ro

If the frequency deviation is zero, then $E=E$_bin and $E$_ro is zero

Thus the Total Energy is made up of:

$$\text{Total Energy} = E\_bin + E\_ro + n$$
$$= E\_bin + E\_back$$

where E_back is the background energy relative to the output of analysis filter 3. Thus, the background energy is calculated by subtracting the energy within the analysis filter from the total energy. The Signal-to-Noise Ratio (SNR) of the analysis filter energy relative to the background energy can be represented as:

$$SNR\_ro = E\_bin/E\_back$$
$$= E\_bin/(E\_ro + n)$$

Thus, there is a direct relationship between SNR_ro and E_ro, the leakage energy due to the roll-off, and consequently the frequency deviation.

For a rectangular window:

Roll-off=$(\sin(x)/x)^2$ with $x=\pi*f*$size$/Fs$

For tolerable frequency deviations up to f=13 Hz, size=200 and Fs=8 kHz x=1.021 and the roll-off is 0.6974. Assuming that the noise (n) is negligible relative to the leaked tone energy E_ro, then:

$E$_back=$E$_ro=(1−Roll-off)*$E$

And $E$_bin=Roll-off*$E$ $$SNR\_ro = \text{Roll-off}/(1 - \text{Roll-off})$$
$$= 0.6974/(1 - 0.6974)$$
$$= 2.3$$

SNR_ro provides an upper threshold limit for tolerable frequency deviation. If the ratio between E_bin and E_back is less than SNR_ro, frequency deviations of more than 13 Hz are accepted. If the threshold is set above SNR_ro, then frequency deviations of up to 13 Hz will not be tolerated.

The dual tone case is very similar to the single tone case set forth above. However, in the case of dual tones the Total Energy is made up of both energies.

$$\text{Total Energy} = E1\_bin + E1\_ro + E2\_bin + E2\_ro + n$$
$$= E1\_bin + E2\_bin + E\_back$$

And $E$_back=$E1$_ro+$E2$_ro+n $SNR1$_ro=$E1$_bin/($E1$_ro+$E2$_ro+n)

Assuming no twist between the tones (E1=E2) and negligible noise, then for a frequency deviation of 13 Hz for both tones $$\begin{aligned}
\text{SNR1\_ro} &= \text{E1\_bin}/\text{E\_back} \\
&= \text{Roll-off}/((1 - \text{Roll-off}) + (1 - \text{Roll-off})) \\
&= 1.15
\end{aligned}$$

The situation is a bit more complicated if the tones have relative twist. Assume $E2 = twist*E1$ and $twist = 6.3096 (=8\ \text{dB})$ with $f=13$ Hz Then $$\begin{aligned}
\text{SNR1\_ro} &= \text{E1\_bin}/\text{E\_back} \\
&= \text{Roll-off}/((1 - \text{Roll-off}) + twist*(1 - \text{Roll-off})) \\
&= \text{Roll-off}/((1 + twist)*(1 - \text{Roll-off})) \\
&= 0.315 \\
&= -5\ \text{dB}
\end{aligned}$$

In this case, $\text{SNR}_{13}$_ro provides the upper threshold limit which, it will be noted, is considerably relaxed relative to the threshold without twist, in order tolerate a frequency deviation of at least 13 Hz when dual tones and twist are present.

The following is a pseudo code implementation for a typical dual tone detector using roll-off:

```
BEGIN
    Calculate Total Energy
    Calculate bin energies at each nominal frequency
    Select two highest frequency bins, ie. E1_bin and E2_bin
    Calculate E_back = Total_Energy - E1_bin - E2_bin
    If E1_bin < SNR1_ro * E_back
        Status = failed
    Elseif E2_bin < SNR2_ro * E_back
        Status = failed
    End
END
```

Although a preferred embodiment of the present invention has been described, those skilled in the art will appreciate that variations and modifications may be made. For example, the embodiment set forth above is implemented via Goertzel DFT filters, whereas the filters 3 can also be implemented as FIR filters or IIR filters. This and all other such alternatives and variations are believed to be within the sphere and scope of the invention as defined by the claims appended hereto.

I claim:

1. A multi-frequency tone detector comprising an analysis filter for detecting the tone energies of an input signal at a plurality of tone frequencies of interest and a decision logic block for detecting presence or absence of said tone frequencies of interest based on said detected tone energies, characterized in that a total energy calculator is provided for calculating total energy of the input signal and said decision logic block detects the presence or absence of said tone frequencies by calculating background energy as total energy minus the tone energies of said input signal at said plurality of tone frequencies of interest, and for each of said tone energies (i) calculating a roll-off signal-to-noise ratio for said analysis filter, (ii) failing any of said tone frequencies of interest for which said tone energies are less than said roll-off signal-to-noise ratio times said background energy and (iii) otherwise passing said tone frequencies.

2. The multi-frequency tone detector of claim 1, further characterized in that said analysis filter has a window size chosen such that adjacent ones of said tone frequencies of interest are located at spectral nulls of said filter.

3. The multi-frequency tone detector of claim 2, further characterized in that said window is a rectangular window.

4. The multi-frequency tone detector of claim 1, characterized in that said analysis filter is a digital filter.

5. A multi-frequency tone detector comprising an analysis filter for detecting the tone energies of an input signal at a plurality of tone frequencies of interest and a decision logic block for detecting presence or absence of said tone frequencies of interest based on said detected tone energies, characterized in that said analysis filter has a window size chosen such that adjacent ones of said tone frequencies of interest are located at spectral nulls of said filter, and further characterized in that a tonal energy calculator is provided for calculating total energy of the input signal and said decision logic block detects the presence or absence of said tone frequencies by calculating background energy as total energy minus the tone energies of said input signal at said plurality of tone frequencies of interest, and for each of said tone energies (i) calculating a roll-off signal-to-noise ratio for said analysis filter, (ii) failing any of said tone frequencies of interest for which said tone energies are less than said roll-off signal-to-noise ratio times said background energy and (iii) otherwise passing said tone frequencies.

6. The multi-frequency tone detector of claim 2, characterized in that said analysis filter is a digital filter.

7. The multi-frequency tone detector of claim 3, characterized in that said analysis filter is a digital filter.

* * * * *